United States Patent [19]
Cooper

[11] 3,861,161
[45] Jan. 21, 1975

[54] VAPOR PRESSURE REGULATOR

[75] Inventor: Michael T. Cooper, Panama City, Fla.

[73] Assignee: The United States of America as represented by the Secretary of the Navy, Washington, D.C.

[22] Filed: Nov. 2, 1973

[21] Appl. No.: 412,067

[52] U.S. Cl. ................................................. 62/50
[51] Int. Cl. ............................................ F17c 7/02
[58] Field of Search ............................ 62/50, 51, 54

[56] References Cited
UNITED STATES PATENTS

| | | | |
|---|---|---|---|
| 2,515,835 | 7/1950 | Preston | 62/50 X |
| 2,951,348 | 9/1960 | Loveday et al. | 62/50 |
| 3,001,374 | 9/1961 | Hutton, Jr. | 62/50 |
| 3,797,262 | 3/1974 | Eigenbrod | 62/50 |

*Primary Examiner*—Meyer Perlin
*Assistant Examiner*—Ronald C. Capossela
*Attorney, Agent, or Firm*—Richard S. Sciascia; Don D. Doty; Harvey A. David

[57] ABSTRACT

A vapor pressure regulator is disclosed of the type which allows the boiloff helium gas from the surface of liquid helium disposed in a dewar to be thermally processed to increase the vapor pressure thereof to such a controlled extent that it can be vented into an ambient environmental medium that has a higher pressure than the vapor pressure of the helium in said dewar, without having a deleterious affect on the liquid helium in said dewar.

10 Claims, 2 Drawing Figures

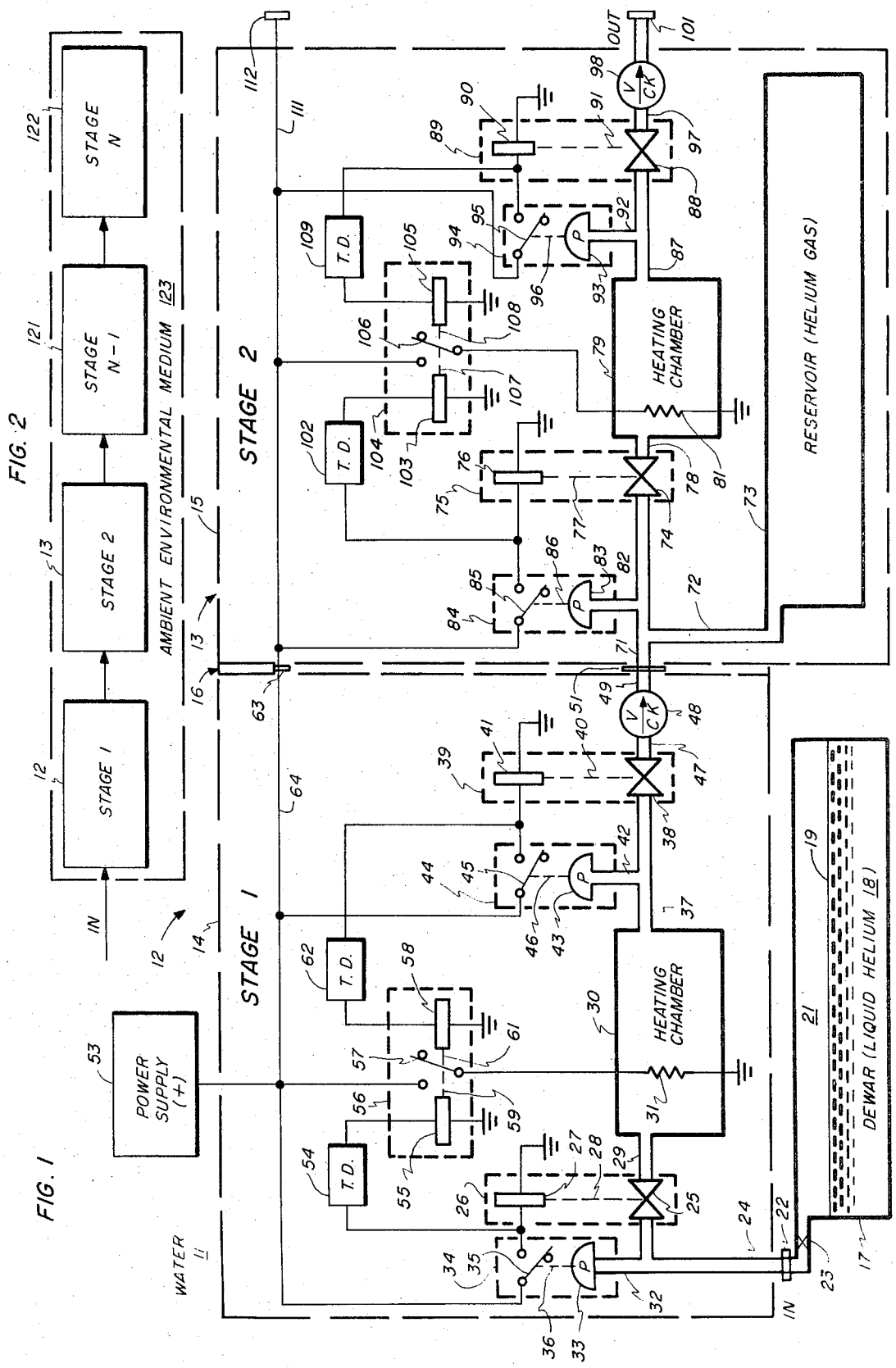

VAPOR PRESSURE REGULATOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to pressure regulators and, in particular, is a vapor pressure regulator. In even greater particularity, the invention consists of a method and means for reciving the boiloff gas from liquid helium contained in a dewar that is disposed in sea water and for expelling said boiloff gas into the sea water ambient to said dewar while maintaining the desired pressure therein.

DESCRIPTION OF THE PRIOR ART

Heretofore, numerous gas pressure regulators, both complex and simple in structure, have been employed to regulate the downstream pressure of gas supplied by a pressurized container having an upstream gas pressure that is greater than the desired pressure of said downstream gas. As a matter of fact, such pressure regulators have been used, for example, in welding equipment, scuba diver breathing equipment, and the like with considerable success, so it does not appear to be necessary to belabor the point. However, to regulate the boiloff pressure of a gas of lower pressure into an object or into a medium of higher pressure is entirely another matter; and in the event the gas boiled off is gaseous helium that is boiled off of liquid helium disposed in a dewar, the pressure control thereof which allows it to be exhausted in water, sea water, or the like, of greater pressure becomes difficult, indeed.

Several systems have been employed to implement the exhausting of gas from a container of given pressure into an ambient medium of higher pressure.

One of such systems mechanically compresses the boiloff gas to a higher pressure than that of the medium within which it is to be exhausted and then exhausts it therein. Unfortunately, such system has the disadvantage of being cumbersome, complex with numerous moving parts and, thus, is potentially unreliable. Moreover, having magnetic fields emanating therefrom would perhaps be deleterious to other operational procedures being conducted in proximity therewith at the same time.

Another of such systems involves the capturing of the boiloff gas as a result of adsorbing it with activated charcoal or charcoal supercooled by liquid nitrogen. However, so doing, too, has some disadvantages, in that a very large amount of charcoal would be required (the bulk of which would ordinarily be prohibited for most practical purposes), and it would have to be reactivated periodically if it is to be efficient and effective, which would be an inconvenience, indeed.

SUMMARY OF THE INVENTION

The instant invention overcomes many of the disadvantages of the known prior art, inasmuch as it is, relatively speaking, self-contained and compact, reliable with few moving parts, works almost automatically, and is comparatively easy and economical to construct, use, maintain, and transport.

Briefly, the subject invention comprises structure for increasing the pressure of the boiloff gas from liquid helium disposed in a dewar that is located within sea water — perhaps at considerable depths — during its intended normal operation. Such pressurized helium gas is then optionally re-pressurized again and again, as many times as is necessary to make the pressure thereof greater than that of the sea water at whatever depth operation is occurring, so that it may be exhausted thereinto by the normal and natural process of going from a higher pressure state to a lower presure state.

It is, therefore, an object of this invention to provide an improved vapor pressure controller.

Another object of this invention is to provide an improved method and means for effecting the exhaust of a gas of given pressure into an environmental medium of a higher pressure than said given pressure.

Still another object of this invention is to provide a system for enabling the boiloff helium gas from a liquid helium dewar to be expelled within a higher pressure medium, such as sea water or the like, ambient thereto or remote therefrom.

A further object of this invention is to provide an improved method and means for maintaining the vapor pressure over a continuously evaporating liquid at some pressure that is below that of a surrounding liquid or gaseous medium, be it environmental or otherwise, be it natural or artificial.

A further object of this invention is to provide an improved method and means for maintaining conditions such as will permit liquid helium or other liquid gases to exist, and thereby permit and sustain the operation of underwater electrical superconducting devices.

Another object of this invention is to provide an improved thermal gas compressor.

Another object of this invention is to provide a pressure relief method and means for the air or other gases used as life support atmospheres in underwater habitats.

Another object of this invention is to provide a vapor pressure controller that is easily and economically manufactured, used, maintained, and transported.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a combination block and schematic diagram of a two-stage vapor pressure control system constituting the preferred embodiment of the subject invention;

FIG. 2 is a generalized block diagram of another species of the invention which incorporates a plurality of series-connected vapor pressure control stages of the types depicted in FIG. 1, respectively.

DESCRIPTION OF THE PREFERRED EMBODIMENT

Referring now to FIG. 1, the instant invention is illustrated as being deployed and used within water 11, which, of course, may be sea water, fresh water, brackish water, or any other type of water or aqueous medium encountered during any given operational circumstances. This particular species thereof includes a first stage 12 and a second stage 13, each of which is operationally connected to the other in the manner discussed in detail subsequently.

At this time, on the one hand, it should be understood that any suitable waterproof encapsulation means or housings 14 and 15 may be used to respectively contain said stages 12 and 13 as separate and detachable units, if so desired; on the other hand, if it were more advantageous to do so, both stages 12 and 13 may be encapsulated in a single, unitary waterproof housing 16. Obviously, it would be well within the purview of the artisan having the benefit of the teaching presented herewith to make whatever housing choices as are necessary to provide optimum operation of and physical protection for the invention during any given operational situation. Accordingly, so doing should not be considered as violating the scope or the spirit of the invention.

As suggested above, the vapor pressure to be controlled may be that of any predetermined gas; nevertheless, in this particular instance — and, thus, without limitation — the gas whose vapor pressure is disclosed as being controlled is gaseous helium which has boiled off from liquid helium that partially fills a dewar, as is customary in the liquid helium containing art. Consequently, a conventional dewar 17 is indicated as containing liquid helium 18, from the surface 19 of which boils off gaseous helium 21. Dewar 17 is, of course, a separate and distinct entity which is connected to the gas input of stage I by means of any suitable pipe coupling 22. Also, as is conventional, dewar 17 has a manual or other shut-off valve 23 located in its exit pipe, so that it may be conveniently stored, used separately, or replaced periodically in the event the helium therein becomes depleted.

Said dewar 17 is herewith depicted in the disclosed preferred embodiment of FIG. 1 as being located outside of housing 14; nevertheless, it should be understood that it may be disposed within housing 14, if so desired, or if operational circumstances dictate that the entire apparatus should be self-contained as a unitary device. Hence, the respective dispositions thereof will be left to the design choice of the artisan.

Coupling 22 is, of course, connected to an entrance pipe 24 which, in turn, is connected to the entrance end of a normally closed but controlled intake valve 25 of a solenoid valve 26 containing a solenoid actuator 27, the latter of which causes said valve 25 to be opened and closed by suitable linkage 28. The exit end of control valve 25 is connected by means of a pipe transfer 29 to the entrance end of a heating chamber 30, which contains (or, if so desired, is operationally associated with) an electrically energized heater 31 for the timely heating thereof.

Entrance pipe 24 is also connected by means of a pressure sampling pipe 32 to a pressure actuator 33 of a pressure controlled switch 34 containing a normally open single throw-double pole switch 35 that has the throw thereof connected by a suitable mechanical linkage 36 to said pressure actuator 33 for timely movement thereby. Switch 34 is of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of the aforesaid heating chamber 30 is connected by means of a transfer pipe 37 to the entrance end of a normally closed control exhaust valve 38, the latter of which is part of a solenoid valve 39 that is opened and closed via linkage 40 by a solenoid actuator 41.

Also connected to said transfer pipe 37 is another gas pressure sampling pipe 42, to which is connected pressure actuator 43 of another pressure controlled switch 44 containing a normally open single throw-double pole switch 45 that has the throw thereof connected by suitable mechanical linkage 46 to said pressure actuator 43 for timely movement thereby. Switch 44 is of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of valve 38 is connected by means of a pipe 47 to the entrance end of a gas check valve 48, employed to prevent reverse gas or other flows in the event stage I is used alone or excessive back pressure happens to become built up for some reason or another.

If stage I is used alone (as will be discussed later), a pipe 49 connected to the exit end of check valve 48 becomes the exhaust pipe thereof, and, thus, it extends into the ambient environmental medium — be it the aforementioned water 11, or some other environmental medium, such as sea water (that is, salt water), air, space, or the like, even though not specifically mentioned herein.

In the event that second stage 13 is necessary for optimum operation during any given operational circumstances, a pipe coupling 51 is conventionally connected to the exit end of exhaust pipe 49, so that said stage II may be easily connected thereto.

So far, the gas flow piping system has been predominantly discussed. Now the electrical system associated therewith will be explained in greater detail.

A power supply 53, preferably of the alternating current type but of any appropriate conventional type, is employed to supply positive electricity (relative to ground) to the electrical apparatus of the invention. It is illustrated in FIG. 1 as being located external to the waterproof housing or housings; however, it should be understood that it may be located within said housing or housings, if so desired, in order to make the entire invention self-contained, so as to, in turn, facilitate its being transported and used as a unitary system. Obviously, it would be within the capabilities of the artisan having the benefit of the teachings presented herewith to make such design choices, without violating the spirit or scope of the invention.

The positive output of power supply 53 is connected to the movable arm of switch 35 of pressure actuated switch 34. The terminal of switch 35 that would become electrically energized upon closure thereof is electrically connected to one of the leads of solenoid actuator 27, with the other lead thereof connected to ground. Said terminal is also connected to the input of an electrical time delay 54, the output of which is connected to the input electrical lead of a solenoid portion 55 of a lock stepping switch 56. The exit electrical lead of solenoid 55 is connected to ground.

Lock stepping switch 56 is of the type that closes the movable arm 57 thereof with the electrical contact thereof connected to the aforesaid power supply 53 upon electrical energization of solenoid 55, and which moves said arm out of contact with said electrical contact upon energization of another solenoid 57, the energization of which will be discussed more fully below. Suffice to say at this time, that solenoids 55 and 58 are connected to the movable arm of switch 57 by means of any suitable mechanical, electromagnetic, or other linkages 59 and 61, respectively.

Although the abovementioned lock stepping switch 56 may, per se, be designed by the artisan to suit his operational purposes, it may also be selected from one thereof (such as model no. 250-384-046) manufactured by LEDEX, Incorporated, of Dayton, Ohio.

Power supply 53 is also connected to the normally open contact of switch 57 and the movable arm thereof is electrically connected to one terminal of the aforesaid heater 31 of heating chamber 30, with the other terminal thereof connected to ground.

The positive output terminal of power supply 53 is also electrically connected to movable arm 45 of pressure actuated switch 44. The operative contact to which said movable arm 45 is put into contact by pressure actuator 43 and linkage 46 is electrically connected to the input of another electrical time delay 62, the output of which is electrically connected to the input of the aforesaid solenoid 58. Of course, the electrical output of solenoid 58 is connected to ground, as is the electrical output of the aforementioned solenoid 55.

The electrical contact which movable arm 45 of pressure actuated switch 44 is moved into contact is also connected to the electrical input of solenoid 41 of solenoid valve 39, with the electrical output thereof connected to ground.

The positive terminal of power supply 53 is also optionally connected to an electrical connector 63 located outside of water-proof housing 14, so that the electrical system of Stage II may be connected thereto, if so desired.

Of course, it should be understood that waterproofing or sealing means, such as packing glands or the like (not shown), should be used to allow all electrical wiring and mechanical piping to extend through the walls of housing 14, in the event the invention is submerged in water or some other contaminating ambient environmental medium. Hence, such packing glands or other sealing means should be used in association with one or both ends of power supply — electrical conductor line 64 — as the case may be — and the aforesaid exhaust pipe 49, where they extend through housing 14, respectively.

From the foregoing, it may readily be seen that Stage I constitutes a new and useful system, per se, which may either stand alone or be operated in conjunction with Stage II, the latter of which will now be discussed in some detail.

Still referring to FIG. 1, second stage 13 is shown to be both electrically and pneumatically connected to connector 63 and coupling 51, respectively. As previously suggested, for some practical purposes, stage I alone may be adequate for effecting the exhaust of the helium gas boiled off of liquid helium in a dewar; therefore, stage II and all subsequent stages, if any, may be considered as being optional, depending upon operational circumstances.

As may readily be seen, pipe coupling 51 is connected to an entrance pipe 71 which, in turn, is connected to a pipe 72 leading to a reservoir 73 which, in this particular instance, happens to constitute a helium gas reservoir that will receive helium gas from entrance pipe 71 or supply helium gas to entrance pipe 71, depending upon the relative pressures thereof.

Entrance pipe 71 is also connected to the entrance end of a control valve 74 of a solenoid valve 75 containing a solenoid actuator 76 which is connected to valve 74 by any appropriate conventional linkage mechanism 77. The exit end of said control valve 74 is connected by means of a pipe 78 to the entrance end of heating chamber 79, which contains an electrically energized heater 81 for the timely heating thereof.

Entrance pipe 71 is also connected by means of a pressure sampling pipe 82 to a pressure actuator 83 of a pressure control switch 84 containing a normally open single throw-double pole switch 85 that has the throw thereof connected by suitable mechanical linkage 86 to said pressure actuator 83 for timely movement thereby. Switch 84 is of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of the aforesaid heating chamber 79 is connected by means of a transfer pipe 87 to the entrance of a control valve 88, the latter of which is part of a solenoid valve 89 having a solenoid actuator 90. Of course, said solenoid actuator 90 is connected to valve 88 by any appropriate linkage means 91 which will effect the proper actuation of said valve 88 by said solenoid 90.

Also connected to said transfer pipe 87 is another gas pressure sampling pipe 92, to which is connected pressure actuator 93 of another pressure controlled switch 94 containing a normally open single throw-double pole switch 95 that has the throw thereof connected by suitable mechanical linkage 96 to said pressure actuator 93 for timely movement thereby. Switch 94 is of the general type that is closed by a first preset pressure and opened by a second preset pressure that is lower than said first preset pressure, the pressure settings of which are selected for the operational circumstances involved. Such a switch may, of course, be obtained commercially from such companies as ASI Servo Systems, Inc., of Newark, N.J., Honeywell, Inc., of Minneapolis, Minn., and Ranco Company of Columbus, Ohio.

The exit end of valve 88 is connected by means of a pipe 97 to the entrance end of a gas check valve 98, employed to prevent reverse gas or other flows at that location within stage II, in the event said stage II is used as the final stage in a two stage embodiment of the subject invention, or in the event excessive back pressures happen to be built up as a result of stages I and II being combined with a third vapor pressure regulator stage (not shown in FIG. 1).

If stage II happens to be the final stage in a two stage embodiment of the invention, pipe 99 connected to the exit end of check valve 98 becomes the exhaust pipe thereof, and, thus, it extends into the ambient environmental medium, regardless of what it may be. On the other hand, in the event a third stage is necessary for optimum operation during any given operational circumstances, a pipe coupling 101 is conventionally connected to the exit end of exhaust pipe 99, so that said third stage may be readily connected thereto at any desired time, including during manufacture and operations in the field.

Again, like in the previously discussed stage I, the gas flow piping system of stage II has now been predominantly discussed. Hence, the electrical system thereof which is associated with said gas flow piping system will now be explained in greater detail.

As a result of the electrical connection made by the aforementioned electrical connector 63, the aforesaid power supply 53 likewise supplies electrical power to stage II. However, although shown in such arrangement in this particular preferred embodiment, it should be understood that stage II may include its own power supply, if so desired, in the event it becomes necessary that it be a self-contained unitary stage which, for example, may be connected to stage I but physically disposed in some location remote thereto. Again, it would ostensively be obvious to one skilled in the art having the benefit of the teachings presented herewith to make such design choices, without violating the spirit or scope of the invention.

As shown in FIG. 1, the positive output of power supply 53 is effectively connected to the movable arm of switch 85 of pressure actuated switch 84. The terminal of switch 85 that would become electrically energized upon closure thereof is electrically connected to one of the leads of solenoid 76, with the other lead thereof connected to ground. Said terminal is also connected to the input of an electrical time delay 102, the output of which is connected to the input electrical lead of a solenoid portion 103 of a lock stepping switch 104. The exit electrical lead from solenoid 103 is connected to ground.

Lock stepping switch 104 is of a type that is similar to the previously discussed lock stepping switch 56 and is of the type that closes the movable arm thereof with the electrical contact thereof that is connected to the aforesaid power supply 53 upon electrical energization of solenoid 103, and which moves said arm out of contact with said electrical contact upon energization of another solenoid 105, the energization of which will be discussed subsequently. In any event, it should be understood at this time that solenoids 103 and 105 are connected to the movable arm of switch 106 by means of any suitable mechanical, electromagnetic, or other linkages 107 and 108, respectively. Again, for purpose of emphasis, the above mentioned lock steppping switch 104 may be designed by the artisan to suit his operational purposes or it may be selected from one thereof (such as model no. 250-384-046) manufactured by LEDEX, Incorporated of Dayton, Ohio.

The positive output terminal of the aforesaid power supply 53 is also effectively electrically connected to the normally open electrical contact of switch 106, and the movable arm thereof is connected to one of the terminals of the aforementioned heater 81 disposed within (or, if so desired, operationally associated with) heating chamber 79, with the other terminal thereof electrically connected to ground.

The positive output terminal of power supply 53 is also effectively electrically connected to movable arm 95 of pressure actuated switch 94. The normally open operative contact thereof to which said movable arm 95 is put into contact by pressure actuator 93 and linkage 96 is electrically connected to the input of another time delay 109, the output of which is electrically connected to the input of the aforesaid solenoid 105. Of course, the electrical output of solenoid 105 is connected to ground, as is the electrical output of the aforementioned solenoid 103.

The electrical contact with which movable arm 95 of pressure actuated switch 94 is moved into contact is also connected to the electrical input of solenoid 90 of solenoid valve 89, with the electrical output thereof connected to ground.

In the event a third stage is to be connected to the output of stage II, electrical wire 111, effectively connected to the aforementioned power supply 53 at one end thereof, has the other end thereof connected to an electrical connector 112 (which is preferably identical to electrical connector 63).

Again, in order to waterproof housing 15 (or 16), suitable packing glands or seals (not shown) should be installed in the housing wall where said wire 111 and the aforesaid pipe 99 extends therethrough.

Referring now to FIG. 2, the generalized embodiment of the invention is disclosed as including stages I and II which are substantially identical to first and second stages 12 and 13 depicted in FIG. 1. Hence, they are referenced by the same numerals. But, in addition, N-1 stage 121 and N stage 122 are illustrated as being series connected additional stages that may be used, if so desired, or if necessitated by operational circumstances. Of course, said stages 121 and 122 are both similar to second stage 13, as far as structure is concerned. And, obviously, although only four stages are shown in FIG. 2, any number thereof may be used in actual practice.

In the preferred embodiment of the invention depicted in FIG. 2, the four stages of the invention are illustrated in a general manner as being disposed within an ambient environmental medium 123. Such showing is, of course, intended to teach that the invention may be deployed and operated in any non-destructive environment, including water, sea water, the atmosphere, space, land, or whatever.

MODE OF OPERATION

The operation of the subject invention will now be discussed briefly in conjunction with both figures of the drawing. In addition, for purposes of convenience and simplification, it will be assumed that the well known ideal gas law — that is, $PV = WRT$ — will hold, and an idealized example thereof will be discussed, although it should be understood that numerous pressures, volumes, temperatures, etc., may be selected, with satisfactory results obtained therefrom during some operational environment situations.

Referring again to FIG. 1, it will also be assumed that in the beginning, in the quiescent state, with the heaters off, the entire system will be at the temperature of the ambient medium. In dewar 17, helium gas 21 boils off surface 19 of liquid helium 18, and becomes warmer and less dense. As helium gas 21 flows through open shut-off valve 23, through entrance pipe 24 and into pressure sampling pipe 32, its pressure increases therein, because at this time valve 25 is still closed. Once the helium gas pressure exceeds the upper presetting of pressure switch 34, pressure actuator 33, via mechanism linkage 36, causes normally open switch 35 to close, thereby supplying electrical power to solenoid 27, the energization of which opens said valve 25 by means of linkage 28. The opening of valve 25, of course, permits the expanding helium gas to travel through pipe 29 into heating chamber 30, where it is heated in a timely manner by electric heater 31. As heating chamber 30 becomes filled with helium gas, the pressure therein is increased; however, due to said filling of heating chamber 30, the pressure in entrance pipe 24 — and, hence, in sampling pipe 32 — decreases to a value below the lower set pressure of pressure switch 36, and pressure actuator 33, thus, at that time, allows switch 35 to open. The opening of switch 35 de-energizes solenoid 27, thereby effecting the closure of valve 25.

As a result of the aforementioned closure of switch 35, electrical power was also supplied to time delay 54. Thus, after a predetermined time period, time delay 54 supplies electrical energy to solenoid actuator 55 of lock stepping switch 56, thereby effecting the timely closure of switch 57. Of course, closure of switch 57 causes heater 31 of heating chamber 30 to be electrically connected to power supply 53 for energization thereby, which, in turn, causes the heating of the helium gas located in heating chamber 30 at that particular time. Because the temperature of said helium gas is increased by heater 31, the pressure thereof is increased, too, and because the pressure thereof increases, the helium gas pressure in transfer pipe 37 and sampling pipe 42 likewise increases to the upper level where pressure actuator 43 of pressure switch 44 causes switch 45 thereof to be closed. Closure of switch 45 causes solenoid 41 of solenoid valve 39 to be energized by power supply 53 and open valve 38, thereby allowing the increased pressure helium gas to pass through transfer pipe 47, check valve 48, exhaust pipe 49, and either into the aforementioned ambient water 11, in the event only a single stage is employed, or through pipe coupling 51 into second stage 13, in the event a second stage is required to build up the pressure of the exhaust helium gas sufficiently to enable it to be exhausted into said ambient environmental water.

For many practical purposes, the exhaust pressure of the helium gas from stage I will be sufficiently higher than the pressure of the ambient environmental medium, after the aforementioned processing thereof, and, in such case, the exhausting thereof is somewhat simplified, because only one vapor pressure regulator is required. However, in the event the ambient medium pressure still exceeds that of the helium gas in exhaust pipe 48, check valve 49 prevents any reverse flow from taking place, thereby preventing the ambient environmental medium from flowing back into and through stage I. Of course, as indicated above, stage II is connected, both electrically and mechanically, to the outputs of stage I. In such case, electrical conductor 111 is connected to electrical conductor 64 by means of electrical connector 53; and entrance pipe 71 is connected to exhaust pipe 49 by means of pipe coupling 51, thereby putting stage II in an operable condition.

As the pressurized helium gas from exhaust pipe 49 passes into stage II, it fills reservoir 73. But, the pressure in reservoir 73 increases as it is filled with more and more helium gas. Eventually, because valve 74 is normally closed, the pressure thereof and, thus, the pressure in entrance pipe 71 and sampling pipe 82 reaches the upper setting level of pressure actuator 83 of pressure switch 84, and normally open switch 85 thereof is closed thereby via linkage 86. Hence, electrical power from power supply 53 is supplied to time delay 102 and solenoid 76 of solenoid vlave 75, the energization of which opens said valve 74 by means of linkage 77.

The opening of the aforesaid valve 74, of course, permits the expanding helium gas to travel through pipe 78 into heating chamber 79, where it is heated in a timely manner by electric heater 81. As heating chamber 79 becomes filled with helium gas, the pressure therein is increased; however, due to said filling of heating chamber 79, the pressure in entrance pipe 72 — and, therefore, in sampling pipe 82 — decreases to value that is below the lower pressure setting of pressure valve 84, and, thus, pressure actuator 83, at that time, allows switch 85 to open. The opening of switch 85 de-energizes solenoid 76, thereby effecting the closure of valve 74.

As a result of the aforementioned closure of switch 85, electrical power was also supplied to time delay 102. Thus, after a predetermined time, time delay 102 supplies electrical energy to solenoid actuator 103 of solenoid switch 104, thereby effecting the timely closure of switch 106. Of course, closure of switch 106 causes heater 81 of heating chamber 79 to be electrically connected to power supply 53 for energization thereby, which, in turn, causes the heating of the helium gas located in heating chamber 79 at that particular time. Because the temperature of said helium gas is increased by heater 81, the pressure thereof is increased, too, and because the pressure thereof increases, the helium gas pressure in transfer pipe 87 and sampling pipe 92 likewise increases to the upper level where pressure actuator 93 of pressure switch 94 causes switch 95 thereof to be closed. Closure of switch 95 causes solenoid 90 of solenoid valve 89 to be energized by power supply 53 and open valve 88 by means of linkage 91, thereby allowing the increased pressure helium gas to pass through transfer pipe 87, check valve 98, exhaust pipe 99, and either into the aforementioned ambient environmental medium or, in the alternative, into a third stage, in the event such third stage is necessary to build up the pressure even further, so that the exhaust helium gas will have a pressure that is greater than that of said ambient medium and, hence, will readily exhaust thereinto.

As may readily be seen, stage II is substantially identical to stage I, with the exception that stage II includes a permanent reservoir 73, while stage I is connected to any portable liquid helium dewar 17. Moreover, it should be understood, that the various and sundry upper and lower pressure settings of pressure switches 34, 44, 84, and 94, as well as the various and sundry time delays of time delays 54, 62, 102, and 109 are selected in such manner as will enable the subject invention to be used within an environmental medium having any predetermined pressure. Hence, it may readily be seen that the respective values of the immediately preceding elements would have to be properly designed for the ambient pressure of the water, sea water, or the like, the pressure of which is, of course, contingent upon the depth involved. Obviously, it would be well within the purview of one skilled in the art having the benefit of the teachings presented herewith to make the proper design parameter selections for said elements, respectively, so that they will operate in combination with the other elements of the subject invention in an optimum manner.

Referring now to FIG. 2, it may readily be seen that it includes a pair of stages 12 and 13 which are identical to the first and second stages of the device of FIG. 1. In addition, stages 121 and 122 are shown as being connected in series therewith, in order to provide the teaching that any number of stages may be incorporated in the subject invention without violating the scope or the spirit thereof. Furthermore, said stages 12, 13, 121, and 122 are depicted as being deployed within an ambient environmental medium 123, which is intended to be without limitation, so that it will be readily understood that the instant invention may be used within any environment that is not sufficiently hostile to destroy it physically.

Again, like the system shown in FIG. 1, the input to the system of FIG. 2 is primarily intended to have a liquid helium dewar connected thereto. Nevertheless, it should be understood that any suitable container containing any liquid or gas having a pressure which is exceeded by that of the environmental medium may be connected to the input of stage I and processed through the entire system of FIG. 2, so as to allow the exhaust gases thereof to be exhausted into said ambient environmental medium 123, even though the pressure of said ambient environmental medium 123 may be greater than that of the liquid or gas located in the container connected to the input of stage I. Of course, such teachings are intended to generalize and, thus, broaden the scope of operation of the invention considerably. Moreover, although one operational cycle is discussed above, such cycles are, or course, repetitive.

At this time, it would appear to be noteworthy that all of the individual elements and components incorporated in the instant invention are, per se, well known, conventional, and commercially available. It is, therefore, to be understood that it is their unique interconnections and interactions which effect the new and useful combination of elements consituting this invention.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A vapor pressure regulator, comprising in combination:
   means adapted for being connected to a container for receiving the vapor of a predetermined substance contained therein;
   means connected to said receiving means for timely confining the vapor received thereby within a predetermined fixed volume, said vapor confining means including a first normally closed solenoid valve connected to the output of said receiving means and adapted for being opened in response to a first predetermined signal; a heating chamber effectively connected to the output of said normally closed solenoid valve; and a second normally closed solenoid valve effectively connected to the output of said heating chamber and adapted for being opened in response to a second predetermined signal;
   means disposed in proximity with the heating chamber of said vapor confining means for the heating of the vapor confined therein in response to the energization thereof;
   means connected to said vapor heating means for effecting the energization thereof while said vapor is confined as a predetermined fixed volume within said confining means; and
   means connected to the output of said vapor confining means for timely exhausting the heated vapor therefrom.

2. The device of claim 1, further characterized by means effectively surrounding said vapor confining means, said vapor heating means, said vapor heating means energization means, and a portion of the aforesaid heated vapor exhausting means for the housing thereof as a fluid tight encapsulated configuration.

3. The device of claim 1, wherein said means adapted for being connected to a container for receiving the vapor of a predetermined substance contained therein comprises a pipe having a pipe coupling connected to the entrance end thereof, and wherein said predetermined substance is liquid helium.

4. The device of claim 1, wherein said means disposed in proximity with said vapor confining means for the heating of the vapor confined therein in response to the energization thereof comprises an electric heater.

5. The invention of claim 1, further characterized by means effectively connected to said vapor receiving means, said first normally closed solenoid valve, said heating chamber, and said second normally closed solenoid valve for timely supplying the aforesaid first and second predetermined signals thereto, respectively.

6. The device of claim 1, wherein said means connected to the output of said vapor confining means for timely exhausting the heated vapor therefrom comprises:
   an exhaust pipe effectively connected to the exit end of said second normally closed solenoid valve.

7. The invention of claim 6, further characterized by a check valve connected to the aforesaid exhaust pipe in such manner as to prevent back pressure flow therethrough.

8. A vapor pressure regulator having a single stage which comprises in combination:
   entrance pipe means adapted for being connected to a vessel containing the vapor the pressure of which is to be regulated;
   a first vapor pressure sampling pipe connected to said entrance pipe means;
   a first normally open pressure actuated switch connected to said first vapor pressure sampling pipe means and preset to be closed in response to a first predetermined pressure therein and opened at a second predetermined pressure therein that is less than said first predetermined pressure;
   a first normally closed solenoid actuated valve connected to the output of said entrance pipe means;

a heating chamber effectively connected to the output of said first normally closed solenoid actuated valve;

an electric heater means disposed in proximity with said heating chamber for the timely heating thereof;

a first transfer pipe connected to the output of said heating chamber;

a second normally closed solenoid actuated valve connected to the output of said first transfer pipe;

a second vapor pressure sampling pipe means connected to said first transfer pipe;

a second normally open pressure actuated switch connected to said second vapor pressure sampling pipe means and preset to be closed in response to a third predetermined pressure therein and opened in response to a fourth predetermined pressure that is lower than said third predetermined pressure;

a check valve means connected to the output of said second normally closed solenoid actuated valve;

exhaust pipe means connected to the output of said check valve means;

an electrical power supply;

a first electrical conductor connected between the output of said electrical power supply and one terminal of said first normally open pressure actuated switch;

a first time delay means for delaying the passing of electrical current therethrough for a first predetermined time period;

a second electrical conductor connected to the input terminals of said first time delay means and the solenoid of the aforesaid first normally closed solenoid actuated valve;

a stable switch means having a normally open switch, a first solenoid for effecting the closing of said switch, and a second solenoid for effecting the opening of said switch;

a third electrical conductor connected between the output terminal of said first time delay means and the input terminal of the first solenoid of said stable switch means;

a fourth electrical conductor connected between the output of the aforesaid power supply and one terminal of the switch of the aforesaid stable switch means;

a fifth electrical conductor connected between the other terminal of the switch of said stable switch means and one terminal of the aforesaid electric heater means;

a second time delay means for delaying the passing of electrical current therethrough for a second predetermined time period;

a sixth electrical conductor connected between one terminal of said second normally open pressure actuated switch, the input terminal of said second time delay means, and to the input terminal of the solenoid of said second normally closed solenoid actuated valve;

a seventh electrical conductor connected between the output of said second time delay and the input of said second solenoid of the aforesaid stable switch means;

an eighth electrical conductor connected between the other terminal of the switch of said second normally open pressure actuated switch and the output of the aforesaid power supply; and a ground electrically connected to the output terminals of each of the solenoids of said first solenoid actuated valve, said stable switch means, and the aforesaid second solenoid actuated valve, and to the other terminal of said electric heating means.

9. The vapor pressure regulator of claim 8, further comprising:

a second stage that is substantially identical to said single stage and connected to the outputs thereof, with said second stage including a reservoir connected to the entrance pipe means of said second stage.

10. A vapor pressure regulator, comprising in combination:

means adapted for being connected to a container for receiving the vapor of a predetermined substance contained therein;

means connected to said receiving means for timely confining the vapor received thereby within a predetermined fixed volume, said vapor confining means including a first normally open pressure actuated switch, having a pressure actuator and an electrical switch effectively connected thereto for actuation thereby, with the pressure actuator thereof being such that it will effect the closure of said electrical switch in response to a first preset pressure and effect the opening thereof at a second preset pressure that is lower than said first preset pressure, and with the pressure actuator thereof effectively connected to the aforesaid receiving means;

a first normally closed solenoid actuated valve, with the solenoid thereof connected between the output terminal of the electrical switch of said first normally open pressure actuated switch and ground, and with the valve thereof connected to the output of the aforesaid receiving means;

a heating chamber effectively connected to the output of the valve of said first normally closed solenoid actuated valve;

a second normally open pressure actuated switch, having a pressure actuator and an electrical switch effectively connected thereto for actuation thereby, with the pressure actuator thereof being such that it will effect the closure of said electrical switch in response to a third preset pressure and effect the opening thereof at a fourth preset pressure that is lower than said third preset pressure, and with the pressure actuator thereof effectively connected to the output of said heating chamber;

a second normally closed solenoid actuated valve, with the solenoid thereof connected between the output terminal of the electrical switch of said second normally open pressure actuated switch and ground, and with the valve thereof effectively connected to the output of said heating chamber; and means connected to the respective input terminals of the electrical switches of said first and second normally open pressure actuated switches for supplying electrical power thereto;

means disposed in proximity with said heating chamber for the heating of the vapor confined therein in response to the energization thereof;

means connected to said vapor heating means for effecting the energization thereof while said vapor is confined as a predetermined fixed volume within said confining means; and means connected to the output of the aforesaid second normally closed solenoid actuated valve of said vapor confining means for timely exhausting the heated vapor therefrom.

* * * * *